US012759897B2

(12) United States Patent
Iwai et al.

(10) Patent No.: US 12,759,897 B2
(45) Date of Patent: Oct. 13, 2026

(54) METHOD FOR PRODUCING LITHIUM TRANSITION METAL COMPOSITE OXIDE

(71) Applicant: Panasonic Intellectual Property Management Co., Ltd., Osaka (JP)

(72) Inventors: Mitsuru Iwai, Osaka Fu (JP); Daisuke Katou, Kyoto Fu (JP); Takuya Jin, Osaka Fu (JP); Tomoo Takayama, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 973 days.

(21) Appl. No.: 17/773,385

(22) PCT Filed: Oct. 13, 2020

(86) PCT No.: PCT/JP2020/038576

§ 371 (c)(1),
(2) Date: Apr. 29, 2022

(87) PCT Pub. No.: WO2021/085114

PCT Pub. Date: May 6, 2021

(65) Prior Publication Data

US 2022/0396497 A1 Dec. 15, 2022

(30) Foreign Application Priority Data

Oct. 31, 2019 (JP) ................................ 2019-198692

(51) Int. Cl.

| | |
|---|---|
| ***H01B 1/08*** | (2006.01) |
| ***C01G 53/50*** | (2025.01) |
| ***H01M 10/0525*** | (2010.01) |

(52) U.S. Cl.
CPC ............... *C01G 53/50* (2013.01); *H01B 1/08* (2013.01); *H01M 10/0525* (2013.01); *C01P 2006/10* (2013.01); *C01P 2006/40* (2013.01)

(58) Field of Classification Search
CPC ........... H01B 1/00; H01B 1/08; H01M 4/043; H01M 4/0433; H01M 4/0435; C01G 53/50
See application file for complete search history.

(56) References Cited

U.S. PATENT DOCUMENTS 5,709,969 A 1/1998 Yamahira
6,077,496 A 6/2000 Ito et al.
(Continued)

FOREIGN PATENT DOCUMENTS

CN 101803073 A 8/2010
CN 103249510 A 8/2013
(Continued)

OTHER PUBLICATIONS

Office Action dated Feb. 21, 2023, issued in counterpart CN Application No. 202080075794.1, with English translation of Search Report. (8 pages).
(Continued)

*Primary Examiner* — Mark Kopec
(74) *Attorney, Agent, or Firm* — WHDA, LLP

(57) ABSTRACT

A method for producing a lithium-transition metal composite oxide includes steps of preparing a first mixture including a lithium-containing compound and a transition metal compound, obtaining a compressed body by compressing the first mixture at least once, obtaining a molded body by molding at least the compressed body, and obtaining a sintered body by sintering the molded body.

6 Claims, 3 Drawing Sheets

(56) References Cited

U.S. PATENT DOCUMENTS

| | | | | |
|---|---|---|---|---|
| 7,429,434 | B2 * | 9/2008 | Mihara | C01G 51/42 429/231.95 |
| 2010/0112447 | A1 | 5/2010 | Yamamoto et al. | |
| 2012/0015249 | A1 * | 1/2012 | Awano | C01B 25/375 241/3 |
| 2013/0336830 | A1 | 12/2013 | Hlirai | |
| 2017/0256794 | A1 | 9/2017 | Tani et al. | |
| 2021/0111404 | A1 | 4/2021 | Kondo et al. | |
| 2022/0059835 | A1 * | 2/2022 | Katou | H01M 10/0525 |

FOREIGN PATENT DOCUMENTS

| | | | |
|---|---|---|---|
| CN | 106575763 | A | 4/2017 |
| CN | 106711441 | A | 5/2017 |
| CN | 109461893 | A | 3/2019 |
| JP | S54-1312 | A | 1/1979 |
| JP | H11-135118 | A | 5/1999 |
| JP | H11-139828 | A | 5/1999 |
| JP | 2001-143706 | A | 5/2001 |
| JP | 2011-235450 | A | 11/2011 |
| JP | 2012-136419 | A | 7/2012 |
| JP | 2014-067694 | A | 4/2014 |
| JP | 2019-99406 | A | 6/2019 |
| JP | 2019-175695 | A | 10/2019 |
| KR | 10-2019-0076746 | A | 7/2019 |
| KR | 20190076746 | A | 7/2019 |
| WO | 2019/194150 | A1 | 10/2019 |

OTHER PUBLICATIONS

International Search Report dated Dec. 22, 2020, issued in counterpart International application No. PCT/JP2020/038576, with English translation. (6 pages).

Extended (Supplementary) European Search Report dated Nov. 25, 2022, issued in counterpart EP application No. 20882650.3. (7 pages).

Office Action dated Sep. 27, 2022, issued in counterpart CN application No. 202080075794.1, with partial English translation. (13 pages).

"Solid Material Structure", Beijing; China Architecture & Building Press, Jul. 31, 1980 pp. 279-281 and 291-292, cited in CN Office Action dated Sep. 27, 2022. (7 pages), (No. English language translation).

* cited by examiner

METHOD FOR PRODUCING LITHIUM TRANSITION METAL COMPOSITE OXIDE

TECHNICAL FIELD

The present disclosure relates to a method for producing a lithium-transition metal composite oxide.

BACKGROUND ART

A secondary battery represented by a lithium ion secondary battery includes a positive electrode, a negative electrode, and an electrolyte. The positive electrode includes, as a positive electrode active material, for example, a lithium-containing composite oxide. As the lithium-containing composite oxide, for example, lithium nickelate is used which is advantageous in achieving a higher capacity. With an aim of further improving the battery performance, studies have been made to replace part of the nickel with a different kind of metal.

Patent Literature 1, relating to a method for producing a lithium-nickel composite oxide, teaches molding a mixed powder of a lithium compound and a compound mainly composed of a transition metal, and packing the resultant molded body on a porous member of a reaction container which is placed on a support in a baking furnace having an electric heater, to form a molded body packed layer. An oxidizing gas such as air is forced to pass through the packed layer, at a rate equal to or higher than a certain superficial velocity, using an air compressing pump, a flow rate regulator, and an air supply pipe with a preheating heater connected thereto. The gas having passed through the packed layer is released outside through a ventilation port.

CITATION LIST

Patent Literature

[PTL 1] Japanese Laid-Open Patent Publication No. H11-135118

SUMMARY OF INVENTION

In molding a mixed powder of a lithium compound and a transition metal compound as in Patent Literature 1, when the strength of the molded body is low, the molded body partially collapses, and the productivity of the positive electrode active material decreases. One possible way to address this is to form a molded body with a sufficient pressure. When the pressure applied to the mixed powder is increased, however, cracks occurs in the particles of the transition metal compound, and the productivity of the positive electrode active material decreases.

One aspect of the present disclosure relates to a method for producing a lithium-transition metal composite oxide, the method including steps of: preparing a first mixture including a lithium-containing compound and a transition metal compound; obtaining a compressed body by compressing the first mixture at least once; obtaining a molded body by molding at least the compressed body; and obtaining a sintered body by sintering the molded body.

According to the present disclosure, it is possible to provide a molded body having sufficient strength, while suppressing the occurrence of cracks in the particles of the transition metal compound, and thus to improve the productivity of the positive electrode active material.

DESCRIPTION OF EMBODIMENTS

A method for producing a lithium-transition metal composite oxide according to an embodiment of the present disclosure includes a first step of obtaining a first mixture including a lithium-containing compound and a transition metal compound, a second step of obtaining a compressed body by compressing the first mixture at least once, a third step of obtaining a molded body by molding at least the compressed body, and a fourth step of obtaining a sintered body (i.e., a lithium-transition metal composite oxide) by sintering the molded body.

By preparing a molded body from a mixture of a lithium-containing compound and a transition metal compound and sintering the molded body, the contact points between the particles in the molded body are increased, and the thermal conductivity of the molded body is improved, which acts advantageously to facilitate the progress of sintering. The higher the strength of the molded body (e.g., crushing strength) is, the more the contact points between the particles increase, and the more the thermal conductivity of the molded body improves.

When the strength of the molded body is low, the molded body is partially collapsed during handling, such as delivering of the molded body, to generate a crushed material, causing the contact between the particles to be insufficient, and thus, the thermal conductivity of the molded body to decrease. Moreover, the molded body is apt to collapse due to the moisture generated from the molded body during sintering, and the contact between the particles tends to be insufficient. Furthermore, the collapse of the molded body forms sparse portions and dense portions, and as a result, the degree of sintering tends to be varied. In order to avoid such inconveniences and improve the crystallinity of the lithium-transition metal composite oxide, it is important to increase the strength of the molded body.

However, in an attempt to secure sufficient strength of the molded body, when the pressure applied for molding is increased, cracks occur in the particles of the transition metal compound, and the productivity of the positive electrode active material decreases.

In view of the above, the present embodiment includes the first to third steps, so that pressure can be applied, in at least two stages, to the first mixture including a lithium-containing compound and a transition metal compound. By applying an appropriate pressure to the first mixture in this way, the strength of the molded body can be improved. Therefore, the occurrence of cracks in the particles of the transition metal compound can be suppressed.

Figure 1:
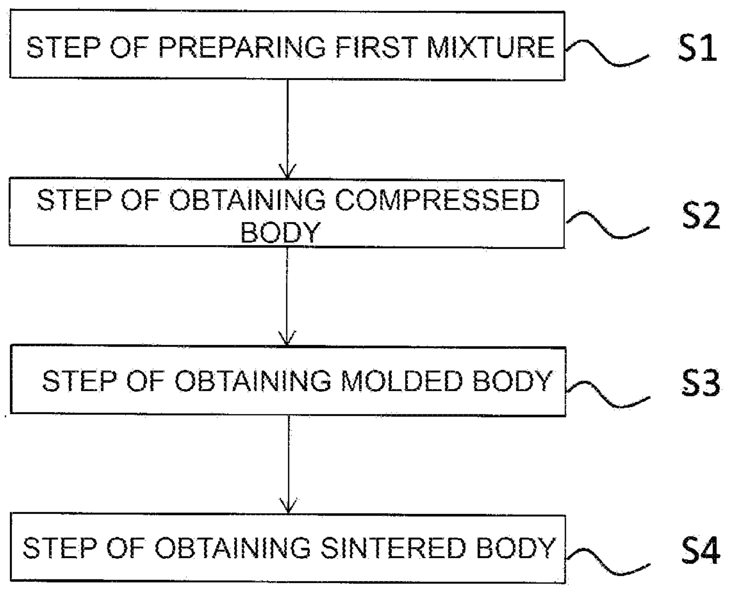
FIG. 1 A flow diagram of a method for producing a lithium-transition metal composite oxide according to an embodiment of the present disclosure.

A description will be given below with reference to FIGS. 1 and 2.

In the first step (S1) of preparing a first mixture, a lithium-containing compound and a transition metal compound which are raw materials of the lithium-transition metal composite oxide are prepared, and they are mixed. The lithium-containing compound and the transition metal compound may be mixed by any method. For example, mixing the lithium-containing compound and the transition metal compound by dry process can provide a first mixture which is advantageous for being subjected to the subsequent step. In the dry mixing of the lithium-containing compound and the transition metal compound, the lithium-containing compound and the transition metal compound are mixed without using a dispersion medium, such as water.

In the second step (S2) of obtaining a compressed body by compressing the first mixture at least once, a pressure for allowing the lithium-containing compound and the transition metal compound to aggregate together is applied to the first mixture. The compressed body obtained in the second step is a lumpy material in which a plurality of (e.g., 1000 or more) particles of the transition metal compound are aggregated. The compressed body encompasses not only a compressed body obtained by compressing the first mixture only once, but also a compressed body obtained by compressing the first mixture twice or more. The compressed body obtained by compressing the first mixture twice or more encompasses, as its subordinate concept, a molded body, and also a crushed material of the molded body.

In the second step, the first mixture may be compressed by any method. The compression of the first mixture can be done using, for example, a briquette molding machine, a pellet molding machine, a granulator, a tableting machine, or the like. That is, the compressed body itself may be a molded body compressed with an appropriate pressure (hereinafter sometimes referred to as a preliminary molded body). The pressure applied when forming a preliminary molded body is preferably restricted to a level that is unlikely to cause cracks in the particles constituting the first mixture.

The compression of the first mixture may be performed using, for example, a nip roll. By passing the first mixture through the nip between a pair of rolls, for example, flakes of a compressed body can be obtained.

The compression or compression molding of the first mixture is preferably carried out by dry process. In the compression by dry process, the mixture is compressed without using a dispersion medium, such as water.

The compressed body may be of any shape or form, and may be, for example, particulate, flaky, spherical, elliptical spherical (long spherical), columnar, elliptical columnar, prismatic, disk-like, or almond-like.

The compressed body may be of any size, but is desirably 5 mm or less in maximum diameter, in view of the ease of molding in the third step. When the compressed body is a lumpy material of formless shape, it may be granulated, for example, into coarse particles that pass through a 5-mm mesh.

The density (d1) of the compressed body may be, for example, 1 g/cm$^3$ or more and 1.8 g/cm$^3$ or less, and may be 1.4 g/cm$^3$ or more and 1.7 g/cm$^3$ or less. When the density of the compressed body is 1 g/cm$^3$ or more, a compressed body which is not easily crushed can be obtained. When the density of the compressed body is 1.8 g/cm$^3$ or less, the particles of the transition metal compound are unlikely to be cracked in obtaining a compressed body.

In the third step (S3) of obtaining a molded body, a further pressure is applied to at least the compressed body, to obtain a molded body from the compressed body. The compressed body has higher fluidity than the first mixture which is a powder mixture, and pressure is more uniformly applied to the compressed body, when molding the compressed body in the third step. Therefore, even with a lower pressure, the contact points between the particles are efficiently increased, and a molded body having high strength can be obtained.

The molding of the compressed body in the third step is also preferably carried out by dry process, and can be done using, for example, a briquette molding machine, a pellet molding machine, a granulator, a tableting machine, or the like.

The density (d2) of the molded body may be, for example, 1.5 g/cm$^3$ or more and 2.2 g/cm$^3$ or less, or 1.6 g/cm$^3$ or more and 1.9 g/cm$^3$ or less. When the density of the molded body is 1.5 g/cm$^3$ or more, the particles constituting the molded body can be brought into sufficient contact (close contact) with each other, and the reaction between the particles tends to be facilitated. When the density of the molded body is 2.2 g/cm$^3$ or less, voids are appropriately formed inside the molded body, and an oxidizing gas such as oxygen can be easily supplied therethrough into the molded body. This can suppress the variations in the degree of sintering of the molded body.

The density (d2) of the molded body is preferably higher than the density (d1) of the compressed body (d2>d1), and the ratio: d2/d1 of the density (d2) of the molded body to the density (d1) of the compressed body is, for example, preferably 1.1 to 1.5, and may be 1.1 to 1.3.

The densities d1 and d2 can be measured by, for example, the Archimedes method or a method using X-ray CT.

In the third step of obtaining a molded body, the compressed body may be molded together with an uncompressed material. Here, a crushed material of the preliminary molded body (crushed material of the compressed body) is not differentiated from the preliminary molded body (compressed body).

Figure 2:
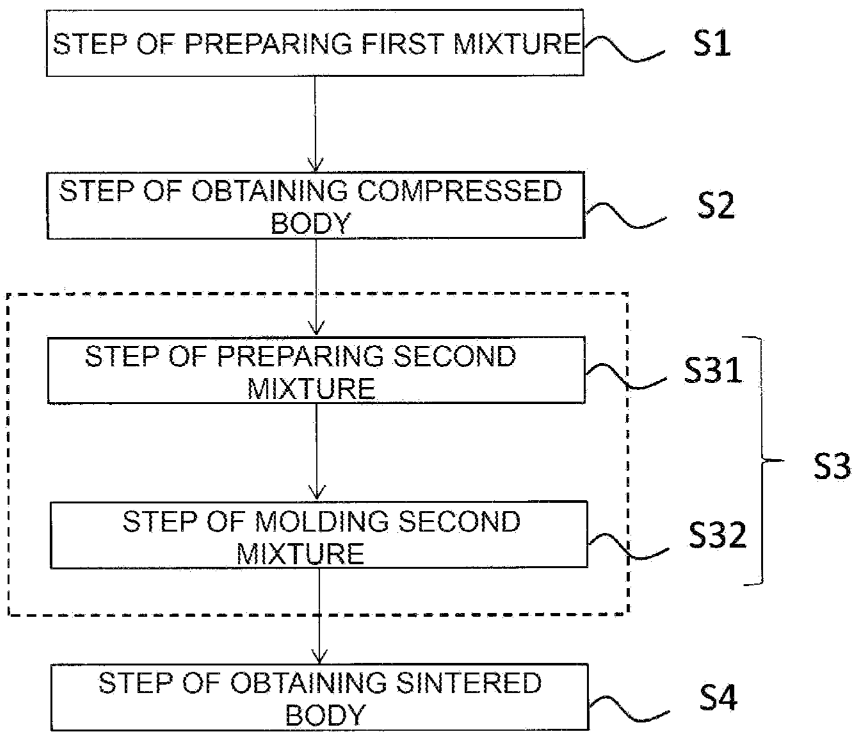
FIG. 2 Another flow diagram of a method for producing a lithium-transition metal composite oxide according to an embodiment of the present disclosure.

For example, the third step (S3) may include a step (S31) of obtaining a second mixture including the compressed body and the first mixture, and a step (S32) of compressing the second mixture, into the molded body (see FIG. 2). When the compressed body and the first mixture are mixed, the fluidity of the second mixture can be appropriately controlled, which makes it easy to control the density (d2) of the molded body as desired.

Also, a crushed material of the molded body may be mixed as part of the compressed body. In this case, material recycling is possible, which improves the productivity.

The second mixture includes the compressed body in an amount of, for example, 10 mass % or more of the second mixture. In the case of molding a mixture composed of 10% by mass or more of the compressed body and 90% by mass or less of the first mixture, the total being 100% by mass, as compared to the case of molding the first mixture only, even with the same pressure, the strength of the molded body can be significantly improved, and the occurrence of cracks in the particles can be remarkably suppressed. The second mixture includes the compressed body in an amount of 10% by mass to 60% by mass of the second mixture.

The maximum length L of the molded body may be, for example, 25 mm or more, and may be 28 mm or more. By using such a large molded body, the circulation of gas through the gaps between the molded bodies can be further facilitated. On the other hand, in view of allowing the sintering to proceed smoothly up to the center of the molded body, the maximum length L of the molded body may be set to, for example, 60 mm or less, and may be set to 40 mm or less. The aspect ratio: h/L of the minimum length h to the maximum length L may be, for example, 0.4 or more. The higher the aspect ratio is, the more the circulation of gas through the gaps between the molded bodies is facilitated.

The maximum length L and the minimum length h of the molded body can be determined from the smallest rectangular parallelepiped that circumscribes the molded body. Of all sides of the six squares constituting the smallest rectangular parallelepiped, the length of the longest side of all sides is the maximum length L. The length of the shortest side of all sides is the minimum length h. The maximum length L and the minimum length h of the molded body may be, for example, an average of 10 values of the maximum length L and an average of 10 values of the minimum length h, respectively, determined for any 10 molded bodies. The aspect ratio also may be an average of 10 values of the aspect ratio determined for any 10 molded bodies.

In the fourth step (S4) of obtaining a sintered body, the molded body is sintered at, for example, 600° C. or higher and 850° C. or lower, into a sintered body (lithium-transition metal composite oxide). The sintering time may be, for example, 2 hours or more and 30 hours or less. The sintering is usually performed in an oxidizing atmosphere containing oxygen or the like. The oxidizing atmosphere may be air or an atmosphere having an oxygen partial pressure higher than that of air. The oxygen concentration in the oxidizing atmosphere is, for example, 20% or more.

The sintering is performed, for example, with a plurality of the molded bodies packed in a predetermined container, while an oxidizing gas is supplied into the container. The material of the container is preferably ceramics, a metal such as stainless steel, and the like, in consideration of the durability against high temperatures. The container usually has a shape which is open at the top, and has a bottom surface and side surfaces rising from the periphery of the bottom surface. The depth of the container (i.e., the height of a space capable of housing the molded bodies, inside the container) may be, for example, 20 mm or more and 300 mm or less, and may be 100 mm or more and 200 mm or less. In view of the ease of handling of the molded bodies in the sintering process of the molded bodies, the container may have a shape of, for example, 100 mm or more and 500 mm or less long, and 100 mm or more and 500 mm or less wide.

The sintering furnace may be of a vertical type or a horizontal type, but may be, for example, a tunnel-type horizontal sintering furnace.

Next, a description will be give below of raw materials of the first mixture.

The lithium-containing compound may be, for example, lithium hydroxide, lithium oxide, lithium carbonate, and the like. In particular, lithium hydroxide is highly reactive with a nickel-containing compound, and is advantageous in obtaining a lithium-nickel composite oxide with improved crystallinity.

Lithium hydroxide is usually in the form of powder and has an average particle diameter (D50: particle diameter at a cumulative volume of 50% measured with a laser diffraction particle size distribution analyzer) of, for example, 10 μm or more and 500 μm or less.

When lithium hydroxide is used, the lithium hydroxide is preferably heated and dried in advance. In the case of using lithium hydroxide having been heated and dried, water is unlikely to be discharged while the molded body is sintered, and a lithium-nickel composite oxide having high crystallinity can be easily obtained.

The heating temperature of the lithium hydroxide is preferably equal to or higher than 100° C. and equal to or lower than its melting point. At 100° C. or higher, the moisture contained in the lithium hydroxide can be efficiently removed. When the heating temperature is equal to or lower than the melting point, the particle shape of the lithium hydroxide is maintained, and the workability is improved, and thus, a homogeneous mixture of the lithium-containing compound and the nickel-containing compound can be easily obtained. The heating time of the lithium hydroxide is, for example, 1 hour or more and 10 hours or less. Heating of lithium hydroxide may be performed in air, but is preferably performed in a non-oxidizing atmosphere containing nitrogen, argon, or the like.

The transition metal compound may be, for example, a transition metal hydroxide, a transition metal oxide, a transition metal sulfate, a transition metal nitrate, a transition metal carbonate, a transition metal oxalate, and the like.

Examples of the metal contained in the transition metal compound includes Ni, Co, Al, Mn, Nb, Zr, B, Mg, Fe, Cu, Zn, Sn, Na, K, Ba, Sr, Ca, W, Mo, Si, Ti, Fe, and Cr. The transition metal compound may be used singly or in combination of two or more kinds. Also, a composite transition metal compound containing two or more kinds of metals may be used. In particular, in obtaining a positive electrode active material with high capacity, it is preferable to use at least Ni. Therefore, a nickel-containing compound is preferably used as the transition metal compound.

Examples of the nickel-containing compound include nickel hydroxide, nickel oxide, nickel sulfate, nickel nitrate, nickel carbonate, and nickel oxalate. The nickel-containing compound may include a metal M1 other than lithium and nickel. For example, it may be a composite hydroxide containing nickel and the metal M1 (hereinafter sometimes referred to as a composite hydroxide A), or a composite oxide containing nickel and the metal M1 (hereinafter sometimes referred to as a composite oxide B).

The composite oxide B can be obtained by, for example, heating the composite hydroxide A to 300° C. or higher and 800° C. or lower. When the composite oxide B obtained by applying heat treatment to the composite hydroxide A is used as a material of the molded body, water is unlikely to be produced from the molded bodies during sintering. This can suppress the reduction in the degree of contact between the lithium-containing compound and the composite oxide B and the reduction in the thermal conductivity of the molded body. As a result, the crystallinity of the sintered body (lithium-nickel composite oxide) tends to improve. In particular, it is preferable to use a mixture (first mixture) of lithium hydroxide and the composite oxide B for the production of a molded body.

The composite oxide B includes a material in which the Ni sites in the crystal lattice of the nickel oxide are partially substituted by the metal M1, or in which the metal M1 is solid-dissolved in the nickel oxide. When the heating temperature of the composite hydroxide A is within the above range, the composite oxide B can be efficiently obtained. The heating time of the composite hydroxide A is, for example, 30 minutes or more and 10 hours or less. Heating of the composite hydroxide A may be performed in a non-oxidizing atmosphere containing nitrogen or the like, and may be performed in an oxidizing atmosphere containing oxygen or the like. The oxidizing atmosphere may be air or an atmosphere having a higher oxygen partial pressure than air. The oxygen concentration in the oxidizing atmosphere is, for example, 20% or more.

The composite hydroxide A can be produced using a known technique, such as coprecipitation. When using coprecipitation, an alkali is added to an aqueous solution containing a nickel salt and a salt of the metal M1, to coprecipitate the composite hydroxide A. The nickel salt may be nickel sulfate and the like. When the metal M1 includes cobalt and aluminum, the salt of the metal M1 may be cobalt sulfate, aluminum sulfate, and the like. The alkali may be sodium hydroxide and the like. The salt and the alkali are not limited to the above.

Nickel is advantageous for achieving a higher capacity and cost reduction. The metal M1 may include cobalt, and may include a metal M2 other than cobalt. Cobalt is advantageous, for example, for extending the battery life. The metal M2 preferably includes at least aluminum. Aluminum is advantageous, for example, for improving the thermal stability. Using a lithium-containing composite oxide containing nickel and aluminum or a lithium-containing composite oxide containing nickel, cobalt and aluminum as the positive electrode active material is effective for achieving a higher capacity and a longer life of a secondary battery.

In view of the stabilization of the crystal structure, the metal M2 may further include at least one selected from the group consisting of manganese, tungsten, niobium, magnesium, zirconium, and zinc.

The composite hydroxide A preferably includes a composite hydroxide containing nickel, cobalt, and the metal M2. When such a composite hydroxide is used, nickel, cobalt, and the metal M2 can be easily dispersed uniformly in the molded body.

Given that the atomic ratio of nickel, cobalt and the metal M2 contained in the composite hydroxide A is Ni:Co:M2=(1-x-y):x:y, x preferably satisfies $0 \leq x < 0.15$, further $0.01 < x < 0.15$, and y satisfies $0.001 < y < 0.1$. In this case, the effect of using nickel, cobalt, the metal M2 (or, nickel and the metal M2) can be obtained in a balanced manner.

The composite hydroxide obtained by coprecipitation can form secondary particles each comprising aggregated primary particles. The secondary particles of the composite hydroxide have an average particle diameter (D50: particle diameter at a cumulative volume of 50% measured with a laser diffraction particle size distribution analyzer) of, for example, 2 μm or more and 20 μm or less.

When a molded body of the first mixture containing lithium hydroxide and the composite oxide B is sintered at 600° C. or higher and 850° C. or lower, to give a lithium-nickel composite oxide (sintered body), a layered rock-salt type lithium-nickel composite oxide in which nickel in lithium nickelate ($LiNiO_2$) is partially substituted by the metal M1 can be obtained. By partially substituting nickel by the metal M1, the battery performance can be further improved.

The lithium-nickel composite oxide preferably has a composition represented by a formula: $Li_aNi_{1-x-y}Co_xM2_yO_2$. In the formula, a satisfies $0.9 < a < 1.1$, x satisfies $0 \leq x < 0.15$, and further satisfies $0.01 < x < 0.15$, and y satisfies $0.001 < y < 0.1$. By using the lithium-nickel composite oxide having the above composition as the positive electrode active material, a secondary battery with high capacity and long life can be obtained.

When the lithium-nickel composite oxide having the above composition is produced, $Ni_{1-x-y}Co_xM2_y(OH)_2$ may be used as the composite hydroxide A. The lithium hydroxide and the composite oxide B are mixed such that, in the first mixture used for the production of a compressed body and a molded body, the atomic ratio: Li/(Ni+M1) of lithium to the total of nickel and the metal M1 in the composite oxide B, for example, exceeds 0.9 but is less than 1.1.

The obtained sintered body may be crushed into powder. The powder may be classified so as to have a desired particle size distribution. For crushing the sintered body, a ball mill, a mortar, or the like is used. For classification, a sieve or the like is used.

The lithium-nickel composite oxide can form secondary particles each comprising aggregated primary particles. The secondary particles of the lithium-nickel composite oxide have an average particle diameter (D50: particle diameter at a cumulative volume of 50% measured with a laser diffraction particle size distribution analyzer) of, for example, 2 μm or more and 20 μm or less.

The lithium-transition metal composite oxide obtained by the above production method can be suitably used as the positive electrode active material of a secondary battery. The secondary battery includes: a positive electrode including a positive electrode active material capable of electrochemically absorbing and releasing lithium ions; a negative electrode including a negative electrode active material capable of electrochemically absorbing and releasing lithium ions; and an electrolyte.

The positive electrode include, for example, a positive electrode current collector, and a positive electrode material mixture layer formed on a surface of the positive electrode current collector. The positive electrode material mixture includes the positive electrode active material as an essential component, and may further include a binder, a conductive agent, and the like, as optional components.

The negative electrode includes, for example, a negative electrode current collector, and a negative electrode material mixture layer formed on a surface of the negative electrode current collector. The negative electrode material mixture includes the negative electrode active material as an essential component, and may further include a binder, a thickener, and the like, as optional components.

Examples of the negative electrode active material include a carbon material, silicon, a silicon compound, metal lithium, and a lithium alloy. The carbon material may be, for example, graphite (e.g., natural graphite, artificial graphite), amorphous carbon, and the like.

The electrolyte may be a liquid electrolyte in which a solute, such as a lithium salt, is dissolved in a solvent. The solvent may be a non-aqueous solvent, and may be water. The electrolyte may be a solid electrolyte.

Usually, a separator is interposed between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

Figure 3:
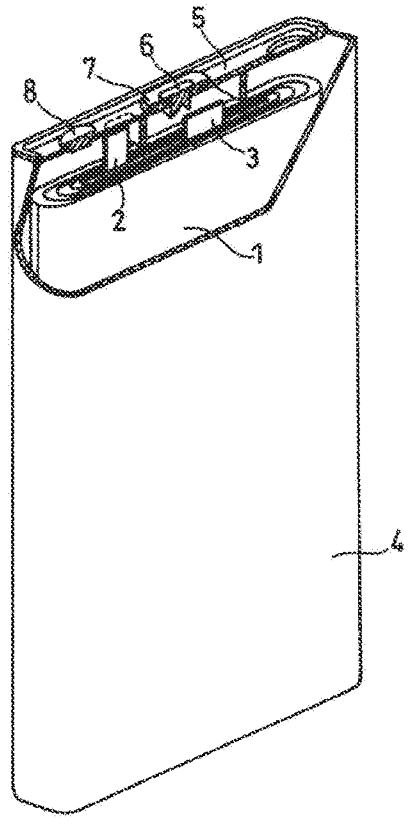
FIG. 3 A partially cut-away schematic oblique view of a prismatic secondary battery.

FIG. 3 is a partially cut-away schematic oblique view of a prismatic secondary battery. The battery includes a bottomed prismatic battery case 4, and an electrode group 1 and a liquid electrolyte (not shown) housed in the battery case 4. The electrode group 1 is of a wound type having a long negative electrode, a long positive electrode, and a separator interposed therebetween.

A negative electrode lead 3 is attached at its one end to the negative electrode current collector of the negative electrode, and connected at its other end to a negative electrode terminal 6 provided on a sealing plate 5. The negative electrode terminal 6 is electrically insulated from the sealing plate 5 by a resin gasket 7. A positive electrode lead 2 is attached at its one end to the positive electrode current collector of the positive electrode, and connected at its other end to the back side of the sealing plate 5. The opening of the battery case 4 is sealed by laser-welding the periphery of the sealing plate 5 to the end of the opening. The electrolyte injection hole provided in the sealing plate 5 is closed with a sealing stopper 8.

The present disclosure will be specifically described below with reference to Examples and Comparative Examples. It is to be noted, however, the present disclosure is not limited to the following Examples.

Example 1

First Step

Lithium hydroxide monohydrate (average particle diameter (D50): 50 μm) was dried by heating at 150° C. for one hour, to prepare a lithium hydroxide. $Ni_{0.85}Co_{0.12}Al_{0.03}(OH)_2$ (average particle diameter (D50) of secondary particles: approx. 15 μm) was obtained as a composite hydroxide A by coprecipitation. The $Ni_{0.85}Co_{0.12}Al_{0.03}(OH)_2$ was heated at 700° C. in air for two hours, and thus, $Ni_{0.85}Co_{0.12}Al_{0.03}O$ was obtained as a composite oxide B. Lithium hydroxide and $Ni_{0.85}Co_{0.12}Al_{0.03}O$ were dry-mixed such that the atomic ratio: Li/(Ni+Co+Al) of Li to the total of Ni, Co and Al became 1.05/1. A first mixture was thus prepared.

Second Step

The first mixture was passed through the nip between nip rolls by dry process, to obtain flakes of a compressed body. The pressure (linear pressure) applied to the first mixture by the nip rolls was adjusted to 0.75 ton/cm so that the compressed body had a density d1 of 1.5 g/cm$^3$. The flakes of the compressed body was granulated into coarse particles that pass through a 5-mm mesh.

Third Step

The coarse particles of the compressed body were subjected to dry compression molding using a briquette molding machine, to obtain an almond-like molded body A1 (maximum length L=28 mm, minimum length h=13.7 mm, aspect ratio: h/L=0.49). The pressure (linear pressure) applied to the coarse particles of the compressed body by the briquette molding machine was adjusted to 1.0 ton/cm so that the molded body A1 had a density d2 of 1.75 g/cm$^3$ (d2/d1=1.17).

Fourth Step

The molded bodies A1 were packed in a ceramics rectangular parallelepiped container of 330 mm long, 330 mm wide and 220 mm deep, and sintered at 750° C. for 5 hours in an oxidizing atmosphere (oxygen concentration: 99%), to obtain sintered bodies (lithium-nickel composite oxide) A1.

The obtained lithium-nickel composite oxide had a composition represented by $Li_{1.05}Ni_{0.85}Co_{0.12}Al_{0.03}O_2$. The composition of the lithium-nickel composite oxide was analyzed by ICP emission spectrometry.

Example 2

A lithium-nickel composite oxide A2 was obtained in the same manner as in Example 1, except that the pressure (linear pressure) applied to the coarse particles of the compressed body by the briquette molding machine in the third step was changed to 1.25 ton/cm, to form a molded body A2, and the molded body A2 was sintered. The molded body A2 had a density d2 of 1.8 g/cm$^3$ (d2/d1=1.2).

Example 3

In the third step, first, 10 parts by mass of the coarse particles of the compressed body and 90 parts by mass of the first mixture prepared in the first step were mixed, to give a second mixture. Next, as did in Example 2, the second mixture was subjected to dry compression molding using a briquette molding machine adjusted to apply a pressure (linear pressure) of 1.25 ton/cm, to obtain an almond-like molded body A3. A lithium-nickel composite oxide A3 was obtained in the same manner as in Example 1, except the above. The molded body A3 had a density d2 of 1.8 g/cm$^3$.

Comparative Example 1

A lithium-nickel composite oxide B1 was obtained in the same manner as in Example 1, except that the first mixture was molded as it was, without subjected to compression between nip rolls, using a briquette molding machine adjusted to apply a pressure (linear pressure) of 1.25 ton/cm, to obtain a molded body B1, and the molded body B1 was sintered. The molded body B1 had a density of 1.7 g/cm$^3$.

Comparative Example 2

A lithium-nickel composite oxide B2 was obtained in the same manner as in Example 1, except that the first mixture was molded as it was, without subjected to compression between nip rolls, using a briquette molding machine adjusted to apply a pressure (linear pressure) of 1.5 ton/cm, to obtain a molded body B2, and the molded body B2 was sintered. The molded body B2 had a density of 1.82 g/cm$^3$.

Evaluation

Crushing Test

The molded bodies A1 to A3, B1 and B2 obtained in Examples 1 to 3 and Comparative Examples 1 and 2 were set in Autograph available from Shimadzu Corporation, and compressed at a compression rate of 10 mm/min, to measure a crushing strength at break.

Particle Cracking Ratio

Each of the molded bodies (lithium-nickel composite oxides) A1 to A3, B1 and B2 was granulated in a mortar to have an average particle size (D50) of 10 μm. Particles having a diameter of 1 μm or less in a volume-based particle size distribution obtained for calculating the average particle size can be considered as being fine powder generated by cracking of particles. Therefore, the percentage by volume (%) of the particles having a diameter of 1 μm or less, in the sample used for measurement was calculated and determined as a particle cracking ratio.

TABLE 1

| Sample | Compressed body (mass %) | First mixture (mass %) | Pressure at molding (ton/cm) | Crashing strength (kgf) | Particle cracking ratio (%) |
|---|---|---|---|---|---|
| A1 | 100 | 0 | 1.00 | 3.9 | 0.3 |
| A2 | 100 | 0 | 1.25 | 7.3 | 0.5 |
| A3 | 10 | 90 | 1.25 | 7.0 | 2.0 |
| B1 | 0 | 100 | 1.25 | 3.6 | 5.3 |
| B2 | 0 | 100 | 1.50 | 8.1 | 8.5 |

In the lithium-nickel composite oxides A1 to A3 obtained in Examples 1 to 3, the particle cracking ratios were all lower than those in Comparative Examples 1 and 2. When Examples 2 and 3 are compared with Comparative Example 1, although the pressures applied to obtain a molded body in the third step were the same, i.e., 1.25 ton/cm, the molded bodies A2 and A3 of Examples 2 and 3 exhibited a crushing strength as high as almost twice the crushing strength of the molded body B1 of Comparative Example 1. The particle cracking ratios in Examples 2 and 3 were remarkably lower than that in Comparative Example 1.

The results of Example 3 show that, even with the second mixture including the compressed body in an amount of as small as about 10% of the second mixture, a molded body with considerably high crushing strength can be obtained, and the particle cracking ratio can be maintained sufficiently low.

The results of Comparative Examples 1 and 2 show that when using the first mixture, which is a powder mixture, as it is, to form a molded body, the particle cracking ratio increases, although the crushing strength of the obtained molded body is low.

INDUSTRIAL APPLICABILITY

The lithium-transition metal composite oxide obtained by the production method according to the present disclosure can be suitably used as, for example, the positive electrode active material of a secondary battery for which a high capacity and high reliability are required.

REFERENCE SIGNS LIST

1 electrode group
2 positive electrode lead
3 negative electrode lead
4 battery case
5 sealing plate
6 negative electrode terminal
7 gasket
8 sealing stopper

The invention claimed is:

1. A method for producing a lithium-transition metal composite oxide, the method comprising steps of:

preparing a first mixture including a lithium-containing compound including lithium hydroxide, lithium oxide, or lithium carbonate, and a transition metal compound including a transition metal hydroxide, a transition metal oxide, a transition metal sulfate, a transition metal nitrate, a transition metal carbonate, or a transition metal oxalate, by a dry process;

obtaining a compressed body including the lithium hydroxide, the lithium oxide, or the lithium carbonate, and including the transition metal hydroxide, the transition metal oxide, the transition metal sulfate, the transition metal nitrate, the transition metal carbonate, or the transition metal oxalate, by compressing the first mixture at least once;

obtaining a molded body including the lithium hydroxide, the lithium oxide, or the lithium carbonate, and including the transition metal hydroxide, the transition metal oxide, the transition metal sulfate, the transition metal nitrate, the transition metal carbonate, or the transition metal oxalate, by molding at least the compressed body, wherein the compressed first mixture is granulated into course particles prior to molding the compressed body; and obtaining a sintered body by sintering the molded body.

2. The method for producing the lithium-transition metal composite oxide according to claim 1, wherein the molded body has a density higher than a density of the compressed body, the density of the compressed body is 1 $g/cm^3$ or more and 1.8 $g/cm^3$ or less, and the density of the molded body is 1.5 $g/cm^3$ or more and 2.2 $g/cm^3$ or less.

3. The method for producing the lithium-transition metal composite oxide according to claim 1, wherein the step of obtaining the molded body includes steps of:

obtaining a second mixture including the compressed body and the first mixture; and compressing the second mixture, into the molded body.

4. The method for producing the lithium-transition metal composite oxide according to claim 3, wherein the second mixture includes the compressed body in an amount of 10 mass % or more of the second mixture.

5. The method for producing the lithium-transition metal composite oxide according to claim 1, wherein at least part of the compressed body is made of a crushed material of the molded body.

6. The method for producing a lithium-transition metal composite oxide according to claim 1, wherein the transition metal compound is a nickel-containing compound.

* * * * *